Dec. 18, 1956        O. SCHILLING        2,774,342

INTERNAL COMBUSTION ENGINE

Filed Jan. 10, 1955        2 Sheets-Sheet 1

INVENTOR

OTTO SCHILLING

BY *Dicke and Craig.*

ATTORNEYS

Dec. 18, 1956 O. SCHILLING 2,774,342
INTERNAL COMBUSTION ENGINE
Filed Jan. 10, 1955 2 Sheets-Sheet 2
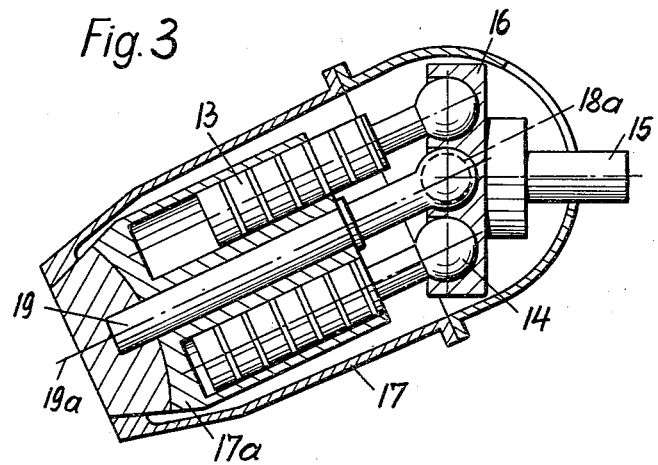
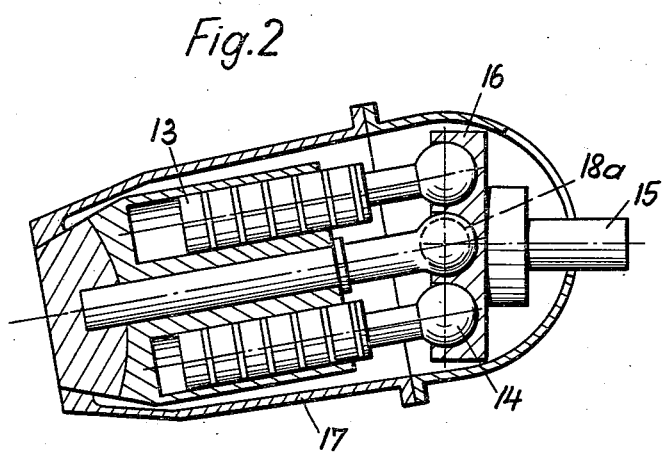
INVENTOR
OTTO SCHILLING
BY Dicke and Craig.
ATTORNEYS United States Patent Office 2,774,342
Patented Dec. 18, 1956

---

2,774,342

INTERNAL COMBUSTION ENGINE

Otto Schilling, Stuttgart-Unterturkheim, Germany, assignor to Daimler-Benz Aktiengesellschaft, Stuttgart-Unterturkheim, Germany Application January 10, 1955, Serial No. 480,943

Claims priority, application Germany January 9, 1954

16 Claims. (Cl. 123—119)

The present invention relates to supercharged internal combustion engines.

Prior to this invention superchargers for internal combustion engines have either been driven directly by the supercharged engine or by a separate motor provided for this purpose and independent of the main engine. The latter method has the advantage over the direct drive that the pressure and output ratios of the supercharger may be controlled independently of the rate of speed of the supercharged engine. This is of particular value in automotive engines wherein a decrease in speed should result in an increase rather than a decrease in the torque of the engine. However, a separate motor for driving the supercharger requires considerable space and is difficult to mount; also it considerably increases the size and weight of the entire engine plant and complicates the operation thereof.

It is an object of the present invention to provide a driving mechanism for a supercharger which does not require a separate motor but still permits the output of the supercharger to be extensively regulated and controlled.

A feature of the invention for attaining this object resides in the provision of a hydrostatic drive for a supercharger which permits the supercharging pressure and thus the torque of the engine to be regulated simply by adjusting the stroke of the oil pump feeding the oil motor of the supercharger. The charging characteristic of the supercharger may thus be easily devised so as to obtain a high supercharging pressure within the low speed range.

Another object of the invention is to provide a simple design and construction of such a hydrostatic drive and particularly of the hydrostatic pump required therefor, and further to provide a simple manner of mounting the same without waste of space.

Another feature of the invention thus resides in the use of a swash-plate mechanism at least for driving the pump, and in a pivotable arrangement of such pump on the main engine, for which purpose the stroke of the pump pistons may be adjusted simply by turning the pump about its pivotal suspension.

A further object and feature of the invention resides in providing a very simple and advantageous method of regulating the hydrostatic pump so as to obtain the most suitable torque of the combustion engine, and such method may include either a manual or automatic adjustment of the stroke of the pump, for example, responsive to the discharge pressure or the rate of speed of the pump.

According to another feature of the invention the stroke of the pump may also be automatically adjusted in response to the charging pressure of the supercharger so as to obtain whatever torque characteristic of the combustion engine may be desired.

A further object of the invention is to provide a drive for a supercharger which satisfies the requirement that the torque increases as the rate of speed decreases.

For this purpose, when starting and driving the engine in the lower speed range, the stroke of the pump may be set to be quite large so as to obtain a high charging pressure and a large torque, while it may be reduced as the speed rate decreases so as to obtain the desired cruising power of the engine at a lower charging pressure. Thus, the adjustment of the pump furnishes an ideal means not only for regulating the fuel supply but especially for adapting the output of the engine to any requirements of operation either manually or automatically.

A further object of the invention is to obtain a safe and reliable operation of the hydrostatic drive, and another feature of the invention accordingly consists in providing the hydrostatic system with a suitable booster pump for replenishing the supply of oil lost by any possible leaks and for cooling the circulating oil. For this purpose an overflow or relief valve is preferably provided between the suction side of the pump and the hydrostatic motor whereby the same amount of circulating oil will be returned to the oil tank as is drawn off therefrom by the booster pump.

It is still another object of the invention to maintain the hydrostatic drive or the oil pump, respectively, within the smallest possible dimensions. For this purpose the oil pump may be driven by a step-up gearing and a similar gearing may be provided between the oil motor and the supercharger so as to obtain the best possible speed ratio between these two units.

Further objects, features, and advantages of the present invention will be apparent from the following detailed description thereof and the accompanying drawings, wherein—

Fig. 2 illustrates in a longitudinal section the principles of design of a hydrostatic or oil pump according to the present invention when adjusted to a small pump stroke; while Fig. 3 shows the same pump when adjusted to a large stroke.

Figure 1:
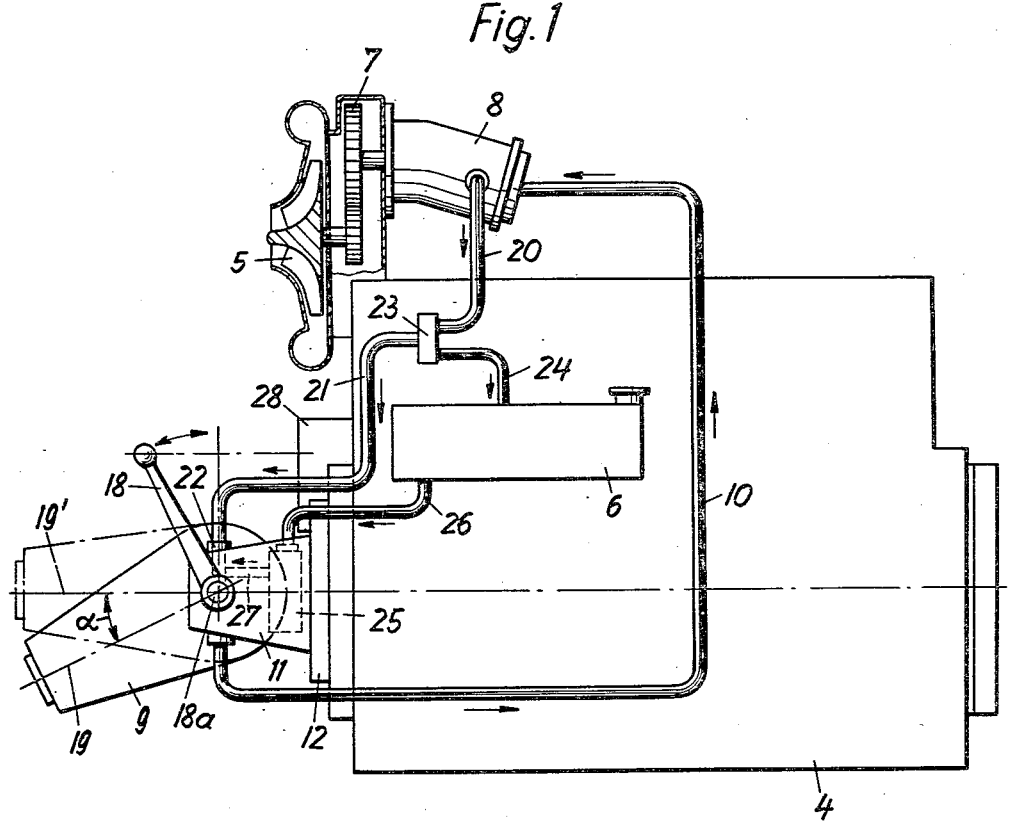
Fig. 1 shows diagrammatically an internal combustion engine provided with a supercharger and a driving mechanism for such supercharger according to the invention.

Referring to the drawings, the internal combustion engine 4 has mounted thereon a supercharger 5 which is driven by an oil motor 8 through a step-up gearing 7. The oil motor 8 is rigidly mounted on the engine block 4 and supplied with oil under pressure by an oil pump 9 through a pressure line 10. The straight-line stroke of the pistons of the oil motor 8 which are disposed at an angle relative to the axis of the shaft carrying the gears 7 is converted into a rotary motion in a manner known as such by means of a swash plate 16 and such motion is then transmitted to the supercharger 5.

The oil pump 9 is mounted on the engine block 4 by means of a suitable suspension 11 and driven thereby through a step-up gearing 12. The pistons 13 of the oil pump 9 are provided with ball heads 14 and are thus pivotally mounted in a swash plate 16 which is rigidly mounted on the drive shaft 15. Rotation of shaft 15 is thus converted into a reciprocatory movement of the pistons 13 and thus of the casing or jacket 17a of the piston cylinders. A centering shaft 19 intermediate the pistons 13 insures the jacket 17a to be always properly centered relative to the swash plate 16. The outer casing 17 carrying the entire piston and swash plate unit has on its outside suitable journals 18a for pivotally mounting the same in the suspension device 11, the axis of journals 18a coinciding with the center of the swash plate 16, that is, with the point of intersection of the axis 19a of the centering shaft 19 and casing 17 and the axis of the drive shaft 15. One of the journals 18a has mounted thereon an arm 18 by means of which the outer casing 17 may be pivoted either manually or automatically about an angle a. If the casing 17 is adjusted as shown in Fig. 3 so that its central axis 19a will be strongly inclined relative to the shaft 15, the oil pump 9 operates with a large stroke and thus accelerates the oil motor 8 considerably, whereas when the casing 17 and its central axis 19a are less inclined relative to the shaft 15, as shown in Fig. 2, the oil pump 9 operates with a small stroke so that the oil motor 8 will then run at a lower speed. If the central axis 19a assumes the position 19′ shown in Fig. 1 in dot-and-dash lines, the piston stroke and thus the output of the oil pump 8 are zero. Thus, the hydrostatic transmission formed by the hydraulic system including the oil motor 8 and the variable oil pump 9 effectively constitutes a torque converter, as is well known in connection with such systems, which may be adjusted for various degrees of torque conversion by adjusting the inclination of swash plate 16 to vary the piston stroke, as disclosed hereinabove.

The oil from the oil motor 8 passes primarily through lines 20 and 21 to the suction side 22 of the oil pump 9 while a portion of the oil is branched off by an overflow or relief valve 23 provided between the suction side 22 of the oil pump 9 and the oil motor 8 to flow through a return line 24 back to a tank 6. A corresponding quantity of fresh oil is then replenished from the tank 6 to the oil pump 9 through lines 26 and 27 by means of a booster pump 25. The amount of oil thus replenished covers any possible losses caused by leakage of the oil pump 9 and also cools the circulating oil.

The hydrostatic drive of a supercharger according to the invention excels by its high efficiency and low temperature developed by its operation. For automatically controlling its adjustment, the arm 18 may be connected to a centrifugal governor 28 which is driven by the combustion engine, or to a hydraulic or other type of governor. Such control may preferably be such that as the rate of speed of the combustion engine decreases, the angle of adjustment α of the pump 9 will automatically increase.

When adjusting the pump 9 by the supercharging pressure, the arm 18 may be adjusted, for example, by a bellows or other barometric device which is subjected to the pressure in the pressure line of the supercharger 5, for example, in such a manner that as the pressure in the pressure line of the supercharger decreases, the angle α increases, thus also increasing the rate of speed of the supercharger, so that a substantially constant supercharging pressure will be assured at all times.

Further, it is possible to combine the speed-responsive control means with the pressure-responsive control means. This may be done, for example, by effecting an adjustment of the barometric device in response to the speed of the engine so that a higher supercharging pressure will be obtained at lower speeds than at higher speeds.

While I have described my invention with reference to the preferred embodiments thereof I wish to have it understood that it is in no way limited to the details of such embodiments or to the specific examples described, but is capable of numerous modifications within the scope of the appended claims.

What I claim is:

1. In an internal combustion engine, the combination comprising a supercharger, and a hydrostatic torque converter transmission for driving said supercharger, said hydrostatic torque converter transmission being provided with piston elements.

2. In an internal combustion engine, the combination comprising a supercharger, a hydrostatic torque converter transmission for driving said supercharger, and adjustable means for controlling said hydrostatic torque converter transmission to vary the torque conversion thereof, the adjustment of said control means effecting an adjustment of the output of said supercharger.

3. In an internal combustion engine, the combination comprising a supercharger, and hydrostatic means for driving said supercharger including a hydrostatic pump, means for driving said pump by said engine, a hydrostatic motor driving said supercharger, and a circuit for conducting a hydraulic medium for driving the hydrostatic motor by means of said hydrostatic pump.

4. In an internal combustion engine, the combination as defined in claim 3, wherein at least the pump of said hydrostatic means is designed as a swash plate machine having a swash plate and pump pistons driven by said plate, and means for adjusting the stroke of said pump pistons.

5. In an internal combustion engine, the combination as defined in claim 3, further comprising means for adjusting the output of said hydrostatic pump.

6. In an internal combustion engine, the combination as defined in claim 3, wherein the hydrostatic pump comprises a swash plate connected to said driving means, pump pistons driven by said swash plate, and means for adjusting the inclination of the pump pistons relative to said swash plate.

7. In an internal combustion engine, the combination comprising a supercharger, a hydrostatic motor driven by said supercharger, a hydrostatic pump, means for driving said hydrostatic motor by said hydrostatic pump, means for driving said hydrostatic pump by said combustion engine, said pump comprising a swash plate connected to said last-mentioned driving means, a rotatable casing forming a plurality of cylinders, pistons slidable within said cylinders, means for pivotally mounting said pistons on said swash plate so that said casing and said pistons rotate together with said swash plate, and means for adjusting the angular position of said casing relative to said swash plate, whereby when said angular position is adjusted the stroke of said pistons in said cylinders will also be adjusted.

8. In an internal combustion engine as defined in claim 7, further including means for guiding said casing relative to said swash plate so that the pivotal axis of said casing intersects with the center of said swash plate.

9. In an internal combustion engine as defined in claim 7, further including a member for supporting said rotatable casing, means for pivotally mounting said supporting member on said combustion engine, and means for mounting the driving means of said pump on said combustion engine so that the pivotal axis of said supporting member intersects with the center of said swash plate, said means for adjusting the angular position of said casing being connected with said means for pivotally mounting said supporting member, the angular position of said casing thus being adjusted by pivoting said supporting member about said pivotal axis.

10. In an internal combustion engine, the combination comprising a supercharger, hydrostatic means for driving said supercharger, and adjustable control means for controlling said hydrostatic means, the adjustment of said control means effecting an adjustment of the output of said supercharger, and said control means including means adjustable in response to the rate of speed of said combustion engine, and means for adjusting said control means by said speed-responsive means.

11. In an internal combustion engine, the combination comprising a supercharger, hydrostatic means for driving said supercharger, and adjustable control means for controlling said hydrostatic means, the adjustment of said control means effecting an adjustment of the output of said supercharger, said control means including means adjustable in response to the charging pressure of said supercharger, and means for adjusting said control means by said pressure-responsive means.

12. In an internal combustion engine, the combination as defined in claim 3, wherein said circuit comprises a conduit leading from said hydrostatic pump to said hydrostatic engine, a return circuit leading from said hydrostatic engine to said pump, a storage tank, a conduit leading from said tank to said pump, and a booster pump in said last conduit.

13. In an internal combustion engine, the combination as defined in claim 12, further including a relief valve in said return circuit, and a conduit leading from said relief valve to said storage tank.

14. In an internal combustion engine, the combination as defined in claim 3, further comprising a step-up gearing intermediate said hydrostatic motor and said supercharger.

15. In an internal combustion engine, the combination as defined in claim 3, wherein said pump driving means comprises a step-up gearing.

16. In an internal combustion engine, the combination as defined in claim 10, wherein said two last-mentioned means are connected with each other so that at lower speeds said supercharger will have a higher output than at higher speeds.

References Cited in the file of this patent

UNITED STATES PATENTS 2,403,399 Reggio ---------------- July 2, 1946